Patented Aug. 20, 1929.

1,725,046

UNITED STATES PATENT OFFICE.

FRITZ BALLAUF, OF ELBERFELD, GERMANY, ASSIGNOR TO GENERAL ANILINE WORKS, INC., OF NEW YORK, N. Y., A CORPORATION OF DELAWARE.

SULPHUR DYESTUFFS FROM DIHYDROINDOLE-INDOPHENOLIC BODIES.

No Drawing. Application filed October 25, 1926, Serial No. 144,187, and in Germany November 2, 1925.

The present invention relates to sulphur dyestuffs dyeing violet to blue shades which are obtained when acting with sulphur upon dihydroindole-indophenolic bodies.

I have described in my co-pending application Serial No. 144,188, filed on even date, that dihydroindoles having the general formula

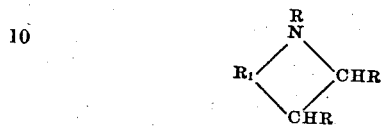

wherein R stands for hydrogen or an alkyl, aralkyl or aryl group, R₁ stands for a benzene nucleus which may be substituted by an alkyl, aryl, aralkyl, halogen or any other monovalent group, will produce indophenolic bodies when submitted to the usual reactions leading to the formation of indophenols. These indophenols form deep red to blue colored alkaline solutions, which are easily reduced to the corresponding leuco-indophenols which are yellow colored crystalline substances, easily soluble in water, alcohol and sulfuric acid. The alkaline solutions of the leuco-indophenols are easily oxydized, for instance by action of atmospheric oxygen, to the corresponding indophenols. The leuco-indophenols have most probably the formula:—

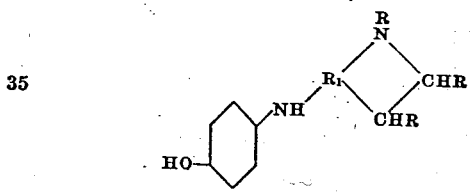

I have now found that by submitting these novel dihydroindole-indophenols or their leuco derivatives to a sulphur fusion novel sulphur colors are produced. The products obtained in both cases are substantially identical; when using the indophenols these are presumably primarily reduced to the leuco-indophenols in the sulphur melt. I wish it therefore to be understood that the term dihydroindole-indophenolic body is used herein as generic for both the indophenols and their leucoderivatives.

The conditions of the sulphur fusion can be varied within wide limits without departing from the spirit of my invention. I prefer, however, to use an alcoholic polysulphide fusion.

My novel sulphur dyestuffs are dark violet to blue powders, they are soluble in sodium sulphide solutions, from which cotton is dyed violet to blue shades exceedingly fast to light and boiling. They can also be reduced to form vats, from which cotton is dyed similar shades.

The following examples will further illustrate my invention, the parts being by weight:—

*Example 1.*—22 parts 2-phenyl-dihydro-indole-5-p-leuco-indophenol of the formula

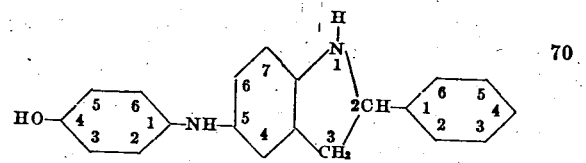

are added to a polysulphide consisting of about 400 parts alcohol, 95 parts calcined sodium sulphide and 117 parts sulphur. The melt is then heated to 170° C. for about 100 hours; the alcohol is then distilled off under addition of water and the aqueous melt filtered off. The excess sulphur is then extracted from the crude product obtained, either by means of a solvent for sulphur, or the correct figured out amount of sodium sulphide. The residue is well washed, filtered and dried. It is a bluish-violet powder which dyes cotton from a sodium sulphide bath violet shades of excellent fastness to light and boiling.

*Example 2.*—17.5 parts 2-methyl-dihydro-indole-5-p-leuco-indophenol of the probable formula:—

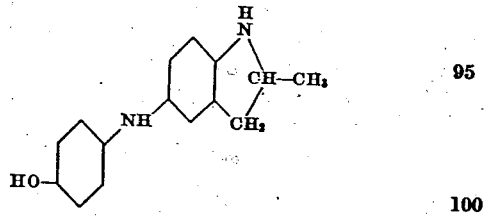

is subjected to an alcoholic polysulphide fusion as described in Example 1. The dyestuff obtained is a violet powder, it dyes cotton from a sodium sulphide bath a dull purple shade of good fastness to light and boiling.

*Example 3.*—By submitting 1-2-dimethyldihydroindole-5-p-leucoindophenol of the probable formula:—

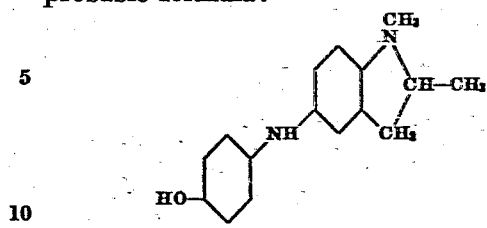

to an alcoholic polysulphide melt as described in Example 1, a sulphur dyestuff is obtained as a blue powder which dyes cotton from a sodium sulphide bath indigo blue shades of good fastness to boiling and light.

I claim:—

1. The process of producing a sulphur color which comprises submitting a dihydroindole-indophenolic body which in form of its leuco derivative has most probably the formula:—

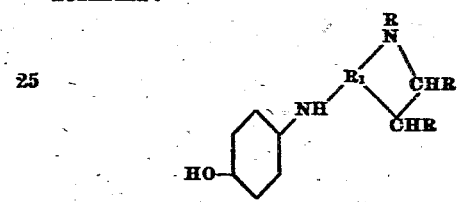

wherein R stands for hydrogen, an alkyl, aryl or aralkyl group. $R_1$ stands for a benzene nucleus which may be substituted by an alkyl aryl, aralkyl, halogen or other monovalent group to a polysulphide fusion.

2. The process of producing a sulphur color which comprises submitting a dihydroindole-indophenolic body which in form of its leuco-derivative has most probably the formula:—

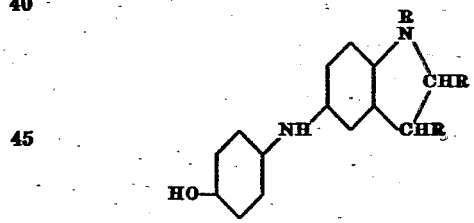

wherein R stands for hydrogen, an alkyl, aryl or aralkyl group to a polysulphide fusion.

3. The process of producing a sulphur color which comprises submitting a dihydroindole-indophenolic body, which in form of its leuco derivative has most probably the formula:—

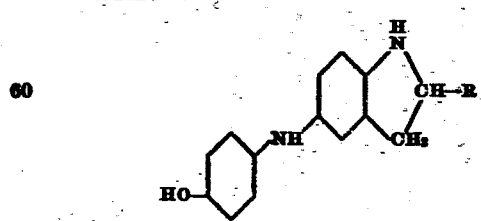

wherein R stands for an alkyl, aryl, or aralkyl group to a polysulphide fusion.

4. The process of producing a sulphur color which comprises treating 2-phenyl-dihydroindole - 5 - p - leucoindophenol of the probable formula:—

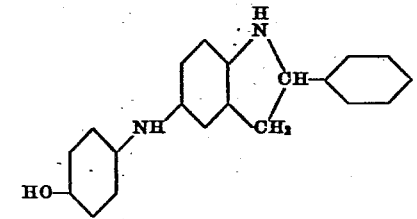

at about 170° C. with an alcoholic polysulphide fusion, in which the polysulphide corresponds about to the formula $Na_2S_4$.

5. As new products sulphur dyestuffs which in the dry state are violet to blue powders, dyeing cotton from a sodium sulphide bath violet to blue shades, particularly fast to light and boiling and which are substantially identical with the products obtained by submitting dihydroindole-indophenolic bodies, which in the form of their leuco-derivatives have most probably the formula:—

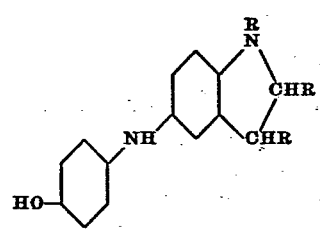

wherein R stands for hydrogen, an alkyl, aryl or aralkyl group to a polysulphide fusion.

6. As new products sulphur dyestuffs which in the dry state are violet to blue powders, dyeing cotton from a sodium sulphide bath violet to blue shades, particularly fast to light and boiling and which are substantially identical with the products obtained by submitting dihydroindole-indophenolic bodies, which in the form of their leuco derivatives have most probably the formula:—

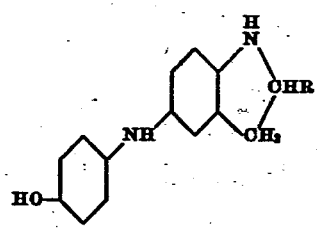

wherein R stands for an alkyl, aryl, or aralkyl group to a polysulphide fusion.

7. As a new product the sulphur dyestuff which in the dry state is a violet powder, dyeing cotton from a sodium sulphide bath violet shades of excellent fastness to light and boiling and which is substantially identical with the product obtained by treating 2-phenyl dihydroindole-5-p-leucoindophenol at about 170° C. with an alcoholic polysulphide in which the polysulphide corresponds about to the formula $Na_2S_4$ and extracting the excess sulphur from the crude dyestuff obtained.

In testimony whereof, I affix my signature.

FRITZ BALLAUF.